(12) United States Patent
Fortin

(10) Patent No.: US 10,370,109 B2
(45) Date of Patent: Aug. 6, 2019

(54) NON-INTRUSIVE AND RECLINING SEATING ARRANGEMENT FOR AN AIRPLANE OR OTHER MEANS OF TRANSPORTATION

(71) Applicant: Enrique Juan Fortin, San Salvador (SV)

(72) Inventor: Enrique Juan Fortin, San Salvador (SV)

( * ) Notice: Subject to any disclaimer, the term of this patent is extended or adjusted under 35 U.S.C. 154(b) by 0 days.

(21) Appl. No.: 15/674,504

(22) Filed: Aug. 10, 2017

(65) Prior Publication Data

US 2019/0039736 A1 Feb. 7, 2019

Related U.S. Application Data

(60) Provisional application No. 62/491,290, filed on Apr. 28, 2017.

(51) Int. Cl.
| | |
|---|---|
| *B64D 11/06* | (2006.01) |
| *B60N 2/02* | (2006.01) |
| *B60N 2/04* | (2006.01) |
| *B60N 2/16* | (2006.01) |
| *B60N 2/22* | (2006.01) |

(52) U.S. Cl.
CPC .......... *B64D 11/064* (2014.12); *B60N 2/045* (2013.01); *B60N 2/1615* (2013.01); *B60N 2/2209* (2013.01); *B64D 11/0606* (2014.12); *B64D 11/0627* (2014.12); *B64D 11/0641* (2014.12); *B64D 11/06395* (2014.12); *B60N 2002/0236* (2013.01)

(58) Field of Classification Search
CPC .............. B64D 11/064; B64D 11/0606; B64D 11/0627; B64D 11/06395; B64D 11/0641; B60N 2/045; B60N 2/1615; B60N 2/2209
USPC ..................................................... 297/354.13
See application file for complete search history.

(56) References Cited

U.S. PATENT DOCUMENTS

| | | | |
|---|---|---|---|
| 2,081,529 A | 5/1937 | Canney | |
| 2,808,787 A | 10/1957 | Murphy | |
| 2,953,103 A | 9/1960 | Bohannon et al. | |
| 5,716,026 A | 2/1998 | Pascasio et al. | |
| 6,059,364 A * | 5/2000 | Dryburgh ............. | A47C 1/0352 |
| | | | 297/354.13 X |
| 6,237,872 B1 | 5/2001 | Bar-Levav | |

(Continued)

*Primary Examiner* — Anthony D Barfield
(74) *Attorney, Agent, or Firm* — H. John Rizvi; The Patent Professor

(57) ABSTRACT

There is disclosed a seating system for use in a means of transportation, allowing passenger seats to recline without intruding into the seating space of the passengers sitting in the row behind. Each seat is supported on an elevated base and is movably carried by a support member which is attached to the base. Each seat comprises a seat bottom and a reversibly reclinable seat back. The seat back is slidably connected to one or more fixed, rearward-sloped tracks which guide the seat back as the support member is operated by an actuator and the seat is moved forward or rearward by the support member. The seat back is disposed frontward and outside of the rear passenger space in any position of the seat back. The elevated base can provide a storage compartment, allowing to eliminate overhead storage bins. A fixed, privacy panel can be arranged behind the seat back.

20 Claims, 6 Drawing Sheets

(56) References Cited

U.S. PATENT DOCUMENTS

| | | | |
|---|---|---|---|
| 6,412,870 B1* | 7/2002 | Higgins | B60N 2/34 |
| | | | 297/342 |
| 8,118,365 B2* | 2/2012 | Henshaw | B60N 2/242 |
| | | | 297/354.13 X |
| 8,678,311 B2 | 3/2014 | Cheung et al. | |
| 8,708,410 B2 | 4/2014 | Scott et al. | |
| 2002/0033432 A1 | 3/2002 | Mikosza | |
| 2004/0036336 A1* | 2/2004 | Veneruso | B60N 2/0232 |
| | | | 297/354.13 |
| 2006/0192050 A1 | 8/2006 | Cheung et al. | |
| 2013/0175840 A1 | 7/2013 | Nadav | |

* cited by examiner

NON-INTRUSIVE AND RECLINING SEATING ARRANGEMENT FOR AN AIRPLANE OR OTHER MEANS OF TRANSPORTATION

CROSS-REFERENCE TO RELATED APPLICATIONS

This application claims the benefit of U.S. Provisional Patent Application Ser. No. 62/491,290, filed on Apr. 28, 2017, which is incorporated herein in its entirety.

FIELD OF THE INVENTION

The present invention relates generally to a reclining seating system for use in high density seating situations, and more particularly, to a reclining seating system for an airplane or other means of transportation, in which each seat does not intrude into a following seat's seating space when fully reclined.

BACKGROUND OF THE INVENTION

It is often necessary when designing and implementing seating plans in many mass transportation systems, or other public seating situations, to arrange the individual seats in a relatively high density. Typically, such seating systems include rows of individual seats arranged in close proximity to each other. This enables a maximum number of seats, and thus paying passengers or patrons, to be packed into a confined or otherwise predetermined space increasing efficient use of the space and maximum profits to the space's provider.

During prolonged transportation times such as, for example, airplane flights, it is often desirable to allow the seats to recline for the comfort of the passengers. Typically, the seats are provided with a provision to allow the seat back to recline backwards during the trip. While this may allow the reclining passenger to better relax, the reclining seat back intrudes into the seating space of the following passenger seated in the row immediately behind the reclining passenger. This causes the following passenger to lose seating space resulting in an uncomfortable and claustrophobic situation. Additionally, the reclining seat back reduces the room the following passenger has for reading a book or magazine or using a laptop or tablet device, and generally limits the use of a service tray associated with the reclining seat back resulting in an uncomfortable situation and unpleasant trip for the following passenger.

Additionally, the reclined seat back does not only cause issues for the following passenger. It also may cause an unpleasant situation for the reclining passenger as well. When the seat back is reclined and enters the seating space of the following passenger, the reclining passenger's shoulders and sides of their head are now exposed to the passengers in the following row. This can leave the reclining passenger feeling exposed to those in the following row and thus vulnerable. This is particularly true if there are unruly or impatient children or pets sitting in the row behind resulting in a very uncomfortable situation for the reclining passenger and thus defeating the purpose of having a reclining seat in the first place.

Further, it is necessary during takeoff and landing of airplane flights to have the passengers keep or return their seats in the upright position. On occasion, certain passengers may inadvertently or even deliberately ignore this imperative resulting in a dangerous situation for themselves, the other passengers and the flight attendants.

A further, and related, hazard presented on airplane flights is the location of the storage bins above the heads of the passengers, particularly the passengers occupying the inboard or aisle seats. Should the overhead storage bin pop open, the cargo contained therein can fall out and injure the passenger seated below. Additionally, the overhead storage bins can generally contribute to a greater claustrophobic feeling in the already confined space of an airplane cabin. Furthermore, overhead storage bins may get in the way of passengers required to rush from their seats in the event of an emergency.

Accordingly, there is an established need for a seating system which delivers a high-density seating arrangement while solving at least one of the aforementioned problems.

SUMMARY OF THE INVENTION

The present invention is directed to a reclining seating system for use in a means of transportation such as, for example, an aircraft or train. The disclosed seating system allows a passenger seat to recline without intruding into the personal or seating space of the passenger sitting in the row behind and without leaving the reclining passenger exposed or vulnerable. The seating system includes a fixed track and a seat having a seat bottom and a seat back connected to the seat bottom. At least one support member is connected to the seat bottom and is operable to move the seat bottom between a rearward and raised position and a forward and downward position. The top edge of the seat back is movably connected to the track via a link that slides within the tract. As the seat bottom moves forward and downward, the bottom part of the seat back is pulled forward and downward while the top part slides down along the track, resulting in the seat being moved to a fully reclined position. The link slides downward along the track, with no part of the seat back ever extending behind the track to intrude into the personal space of a passenger in a following row. As the seat bottom is raised, the seat back is pushed up to place the seat in a fully upright position. An actuator is provided to move the seat between the fully upright and fully reclined positions. The reclining seating system minimizes the claustrophobic feeling in an enclosed space and allows passengers to recline their seats without invading adjacent passenger space. Furthermore, the system can include bottom storage spaces which can replace existing airplane overhead bins, contributing to increase passenger safety.

In a first implementation of the invention, a seating system for a means of transportation comprises a plurality of seat assemblies, which can be organized in rows. Each seat assembly includes a respective seat. The seat has a seat bottom and a seat back. The seat back is reversibly rectifiable relative to the seat bottom from an upright position to a fully reclined position. The seat assembly further includes at least one support member movably connected to a base and supporting the seat, and at least one rearward-sloped track extending upward of the base, wherein the seat back is movably connected to the track. In addition, the seat assembly comprises an actuator for causing a first movement of the support member configured to cause a forward and downward advance of the seat bottom and a descent of the seat back guided by the track towards the fully reclined position, and a second movement of the support member configured to cause a rearward and upward movement of the seat bottom and a rising of the seat back guided by the track towards the upright position.

In a second aspect, the support member can be pivotably connected to the base, and the first and second movements of the support member can include a forward and rearward pivoting, respectively, of the support member relative to the base.

In another aspect, the support member can be pivotably connected to the seat bottom of the seat.

In another aspect, the support member can include a forward support and a rear support, which are pivotably connected at first ends to the seat bottom and at opposite ends to the base.

In another aspect, the actuator can include a drive gear engageable with a driven gear of the support member such that rotation of the drive gear causes the driven gear to rotate and the support member to pivot. The actuator can further include a motor configured to rotate the drive gear.

In another aspect, the support member can be configured to maintain the seat bottom in a parallel relationship with the base during the forward and downward advance of the seat bottom and during the rearward and upward movement of the seat bottom.

In another aspect, the at least one rearward-sloped track can include a pair of rearward-sloped tracks arranged on opposite sides of the seat back.

In another aspect, the seat back can be slidably connected to the at least one rearward-sloped track.

In another aspect, the seat assembly can further include at least one link which is connected to the seat back and slidably mounted within a respective track of the at least one rearward-sloped track.

In another aspect, the link can be connected to an upper edge of the seat back.

In another aspect, the seat assembly can further include a privacy panel arranged behind the seat back and shielding the reclining seat back from a seat behind the seat assembly.

In another aspect, the seat back can be arranged frontward of the privacy panel in both the fully reclined position and the upright position.

In another aspect, the privacy panel can be non-movable relative to the base.

In another aspect, the base can be elevated relative to a floor of the means of transportation.

In another aspect, the base can include at least one storage compartment arranged inside the base and situated beneath the seat.

In another aspect, the one or more storage compartments can be accessible from a top of the base.

In another aspect, the one or more storage compartments are accessible when the seat back is in the upright position and is not accessible when the seat back is in the fully reclined position.

In another aspect, the actuator can include a central processing unit and at least one user-operable control for operating the actuator.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exeinplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a seating system for use in a high-density seating situation in various means of transportation that allows a seat of the seating system to recline without intruding into the seating space of a seat located immediately behind the reclined seat.

Figure 1:
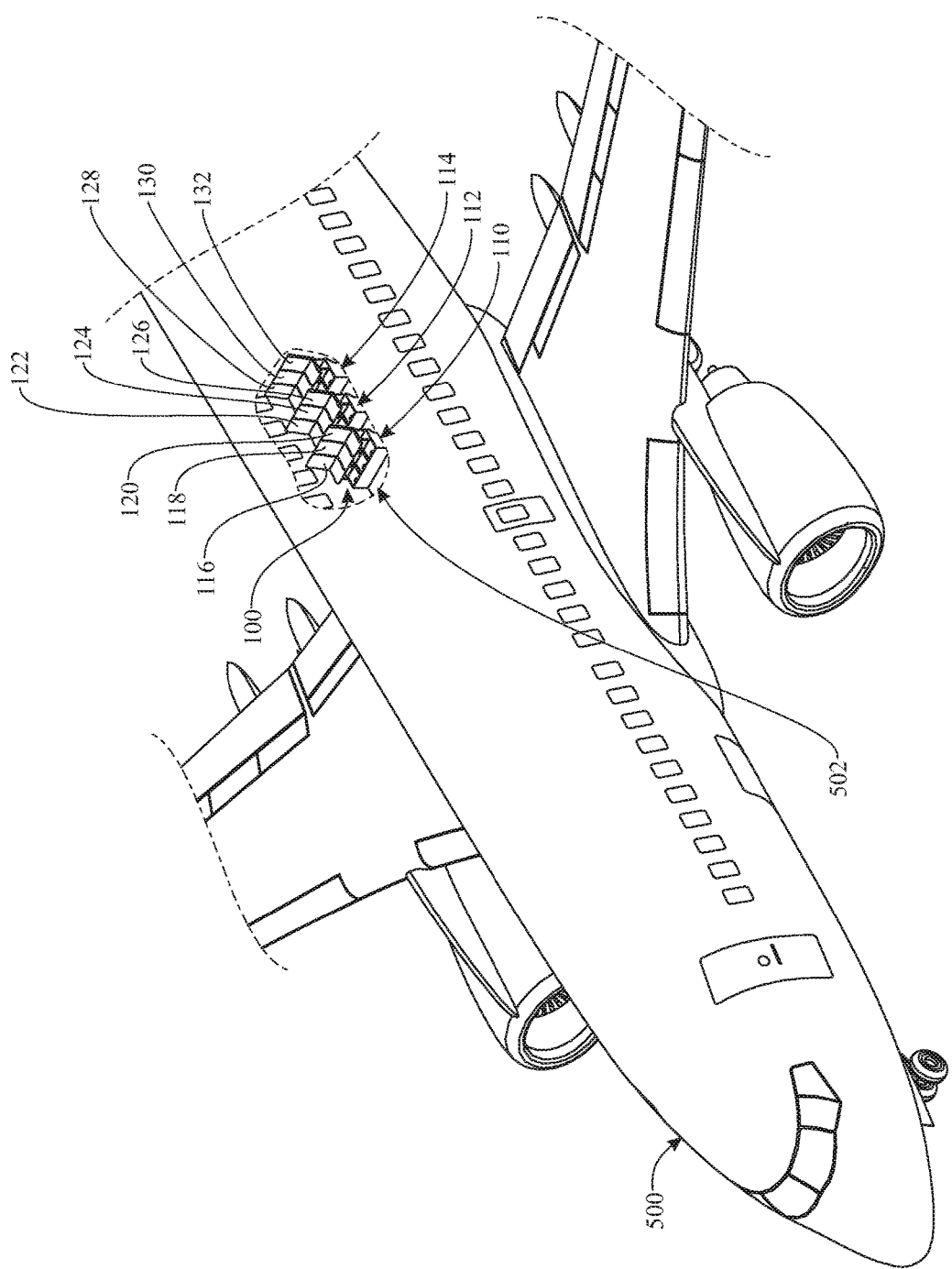
FIG. 1 presents a top front isometric view of a front portion of an airplane, with a portion of the fuselage of the airplane cut away, showing a seating system in accordance with an illustrative implementation of the present invention.

Referring initially to FIG. 1, a seating system 100 is illustrated in accordance with an exemplary embodiment of the present invention, configured as multiple seat assemblies positioned in multiple rows of individual seat assemblies arranged within an aircraft 500. As shown, the seat assemblies are arranged in rows within a cabin 502 of the aircraft 500, the rows including a first row of seat assemblies 110, a second row of seat assemblies 112 and a third row of seat assemblies 114. Each row of seat assemblies 110, 112 and 114 has, in this configuration, three seat assemblies. For example, the first row of seat assemblies 110 includes an outboard or window seat assembly 116, a center seat assembly 118 and an inboard or aisle seat assembly 120. Similarly, the second row of seat assemblies 112 includes a window seat assembly 122, a center seat assembly 124 and an aisle seat assembly 126. Likewise, the third row of seat assemblies 114 also includes a window seat assembly 128, a center seat assembly 130 and an aisle seat assembly 132. While only three rows of seating assemblies of the disclosed seating system 100 are shown, the disclosed seating system 100 may be used in more or less than three rows of seating assemblies each having more or less than three seats within each row.

Figure 2:
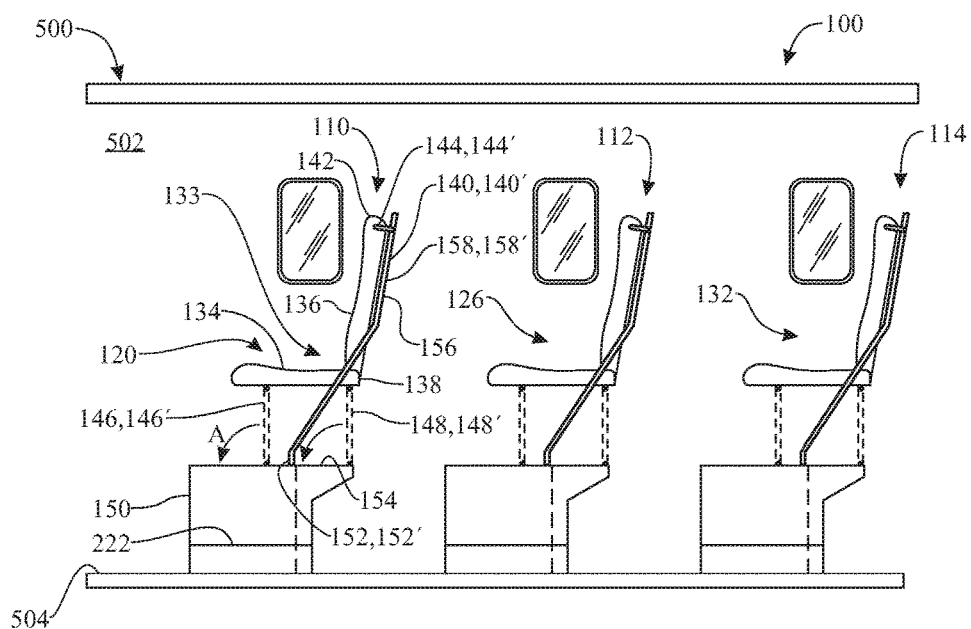
FIG. 2 presents a side elevation view of three rows of the seating system of FIG. 1 inside the airplane, with the individual seats of the three rows of the seating system in a first or upright position.
Figure 10:
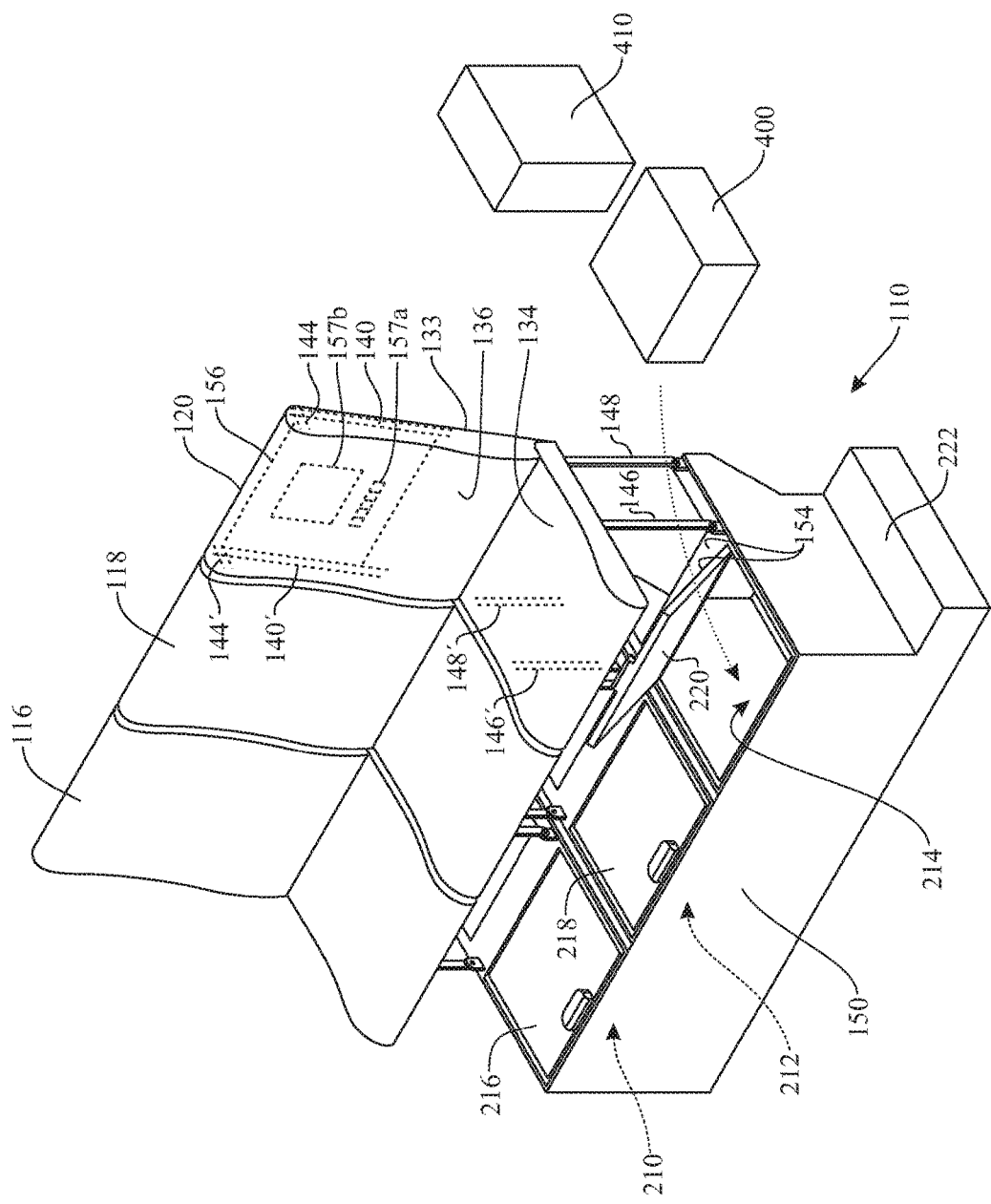
FIG. 10 presents an isometric view of one row of seats of the seating system and illustrating a storage base associated with the seating system for mounting and support of the row of seats of the seating system.

Referring now to FIGS. 2 and 10, the details of the seating system 100 will now be described with regard to the aisle seat assembly 120 located in the first row of seat assemblies 110. The remaining seat assemblies of the first, second and third rows of seat assemblies 110, 112 and 114 are substantially identical. The aisle seat assembly 120 includes a seat 133 having a seat bottom 134 and a seat back 136. The seat bottom 134 and the seat back 136 are formed from conventional seating materials and may be movably connected along a union such as a common seam 138. The aisle seat assembly 120 further includes a pair of fixed, sloped tracks including an inboard track 140 and an outboard track 140' which can be arranged in a registering, side-by-side relationship with one another as shown. An upper edge 142 of the seat back 136 is movably connected to the inboard and outboard tracks 140, 140' by a pair of links 144, 144'. The links 144, 144' are pivotally affixed to the seat back 136 and are slidable within the respective tracks 140, 140' to allow the seat back to slide up and down relative to the tracks 140, 140' preferably without passing behind the tracks 140, 140' in a manner described in more detail hereinbelow.

The seat bottom 134 is movably supported within the aircraft cabin 502 by a pair of inboard and outboard forward supports 146, 146' and a pair of inboard and outboard rear supports 148, 148'. The inboard and outboard forward supports 146, 146' can be arranged in a registering, side-by-side relationship with one another. Similarly, the inboard and outboard rear supports 148, 148' can be arranged in a registering, side-by-side relationship with one another. Inboard and outboard forward supports 146, 146' and inboard and outboard rear supports 148, 148' support the seat bottom 134 for translational vertical and horizontal movement relative to an elevated base 150 associated with the aisle seat assembly 120 in order to allow the seat back 136 of the seat 133 to recline. Alternatively, the inboard and outboard forward and rear supports 146, 146' and 148, 148', respectively, may support the seat bottom 134 directly on a floor 504 of the aircraft cabin 502. Bottom ends 152, 152' of the tracks 140, 140', respectively, can be fixedly attached to an upper surface 154 of the elevated base 150 or, in other embodiments, to the floor 504 of the aircraft cabin 502.

In order to prevent a passenger in a following seat, for example the aisle seat assembly 126 of the second row of seat assemblies 112, from seeing or interfering with a reclining passenger seated in the seat 133 of the aisle seat assembly 120, a privacy backing, screen or panel 156 is incorporated into the aisle seat assembly 120. The privacy panel 156 between and is secured to or formed within upper portions 158, 158' of the tracks 140, 140'. In different embodiments of the invention, the privacy panel 156 may extend the full length or a portion of the tracks 140, 140'. The privacy panel 156 may include at least one user-operable control 157a, and/or an audio and/or video user interface (e.g., a screen 157b, as shown) enabling the passenger in the immediately following seat, for example a passenger in aisle seat assembly 126 in the second row of seat assemblies 120, to view movies, television and or flight data as well as control sound and channels and/or ventilation, heating and cooling and lighting for their surrounding area.

Figure 3:
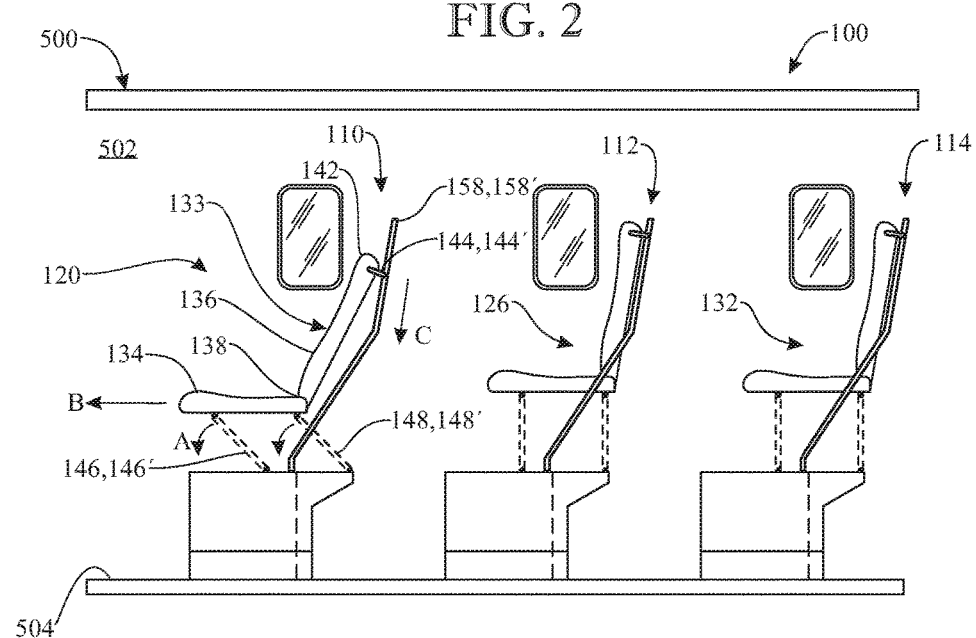
FIG. 3 presents a side elevation view, similar to FIG. 2, with a first-row seat of the seating system sliding and reclining from the first position toward a second or reclined position.
Figure 4:
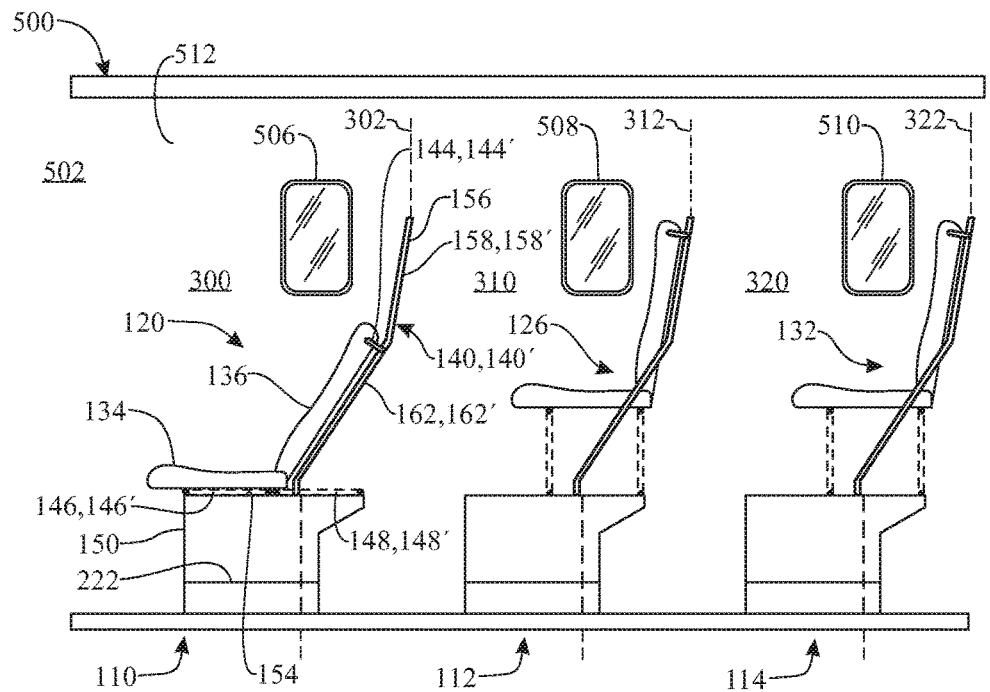
FIG. 4 presents a side elevation view, similar to FIG. 2, with the first-row seat of the seating system in the second or fully reclined position.

Referring now to FIGS. 2-4, the operation of the seating system 100 to recline the aisle seat assembly 120 will now be described. As best shown in FIG. 2, the seat back 136 is initially in the fully upright position with the links 144, 144' at their uppermost position along the tracks 140, 140'. The forward supports 146, 146' and the rear supports 148, 148' are vertically arranged maintaining the seat bottom 134 in a highest position relative to the elevated base 150. When a passenger in the seat 133 of the aisle seat assembly 120 wishes to recline his or her seat back 136, the passenger can operate a lever (not shown) or an actuating system 160 (FIG. 8) to cause the forward and rear supports 146, 146' and 148, 148', respectively, to rotate forward and downward in the direction of arrow "A" (counterclockwise according to the orientation of the drawing). As the forward and rear supports 146, 146' and 148, 148' begin to rotate in the direction of arrow "A" (FIG. 3), the seat bottom 134 is moved forward and downward in the direction of arrow "B" along a path parallel to the floor 504 of the cabin 502. Because the seat bottom 134 is connected to the seat back 136 along the seam 138, moving the seat bottom 134 forward and downward draws the seat back 136 and thus the links 144, 144' downward along the tracks 140, 140' in the direction of arrow "C". As the links 144, 144' move down the upper portions 158, 158' of the tracks 140, 140', the seat back 136 moves from a fully vertical position (FIG. 2) to an angled or more reclined position (FIG. 3).

In alternative embodiments of the invention, the forward and rear supports 146, 146' and 148, 148' may be arranged differently so that their forward and downward movement takes place in a clockwise direction instead of a counterclockwise direction. In other words, arrow "A" could alternatively be oriented clockwise and the forward and downward movement could take place inversely, i.e. downward and forward.

Turning to FIG. 4, once the forward and rear supports 146, 146' and 148, 148' have fully rotated to bring the seat bottom 134 down to the level of the upper surface 154 of the elevated base 150, the links 144, 144' are at the lowest position along angled portions 162, 162' of the tracks 140, 140', and the seat bottom 134 has reached a maximum-advance position thereby causing the seat back 136 to adopt a fully reclined position. As an additional note, since the seat bottom 134 is at a lower position in the fully reclined position of seat 133, access to the seat bottom 134 and ease of seating by passengers may be improved. In one contemplated configuration, all the seat bottoms of the disclosed seat assemblies would initially be in the lowest position facilitating initial seating of passengers. Alternatively or additionally, all the seat bottoms of the disclosed seat assemblies would initially be in the highest position to facilitate the loading/unloading of luggage 400 and 410 from compartments 210, 212 and 214 (FIG. 10), and passengers can use at least one aisle step 222 provided at the aisle end of the elevated base 150 to access the upper surface 154, which serves as a new floor.

With continued reference to FIG. 4, within the aircraft cabin 502, each row of seating such as the first row of seat assemblies 110, the second row of seat assemblies 112 and the third row of seat assemblies 114, has an area of personal space within the aircraft cabin 502 in front of and around the associated seats within the rows. These personal spaces are shown as the personal space 300 in front of the first row of seat assemblies 110, the personal space 310 in front of the second row of seat assemblies 112 and the personal space 320 in front of the third row of seat assemblies 114 which are respectively arranged between imaginary planes 302, 312 and 322 which extend vertically upward from the seat backs (e.g, seat back 136) in the upright position of FIG. 2, or from a top end of the tracks (e.g. tracks 140, 140'). Thus, as shown in FIG. 4, when a passenger in the seat 133 of the aisle seat assembly 120 in the first row of seat assemblies 110 fully reclines the seat back 136, the seat back 136 does not intrude into the personal space 310 of the passenger sitting in the aisle seat assembly 126 in the following second row of seat assemblies 112. This greatly increases the comfort of the passenger in the aisle seat assembly 126 by maintaining the maximum amount of personal space 310 and avoiding any possible conflicts during flight. Furthermore, as shown in the reclining sequence of FIGS. 2-4, the privacy panel 156 between the tracks 140, 140' of the seating system 100 does not tilt as the seat back 136 reclines, but rather remains substantially in the upright position so that the passenger occupying the aisle seat assembly 126 of the second row of seat assemblies 112 can conveniently utilize the controls 157a and screen 157b regardless of the extent to which the front passenger has reclined the seat back 136. In addition, the provision of the privacy panel 156 prevents the passengers in the second row of seat assemblies 112 from seeing or interfering with the passenger in the now reclined seat 133 in the first row of seat assemblies 110.

The disclosed seat assemblies additionally provide a further benefit to passengers in a following row from the reclined seat in that their enjoyment and view of windows associated with each row is not blocked by a reclining seat back. For example, a typical aircraft 500 may include a first window 506 associated with the first row of seat assemblies 110, a second window 508 associated with the second row of seat assemblies 112, a third window 510 associated with the third row of seat assemblies 114, and so on mounted within an outer wall 512 of the aircraft 500. While not specifically shown, it can be envisioned that, even though a seat back of the window seat, for example the window seat assembly 116 in the first row of seat assemblies 110 (FIG. 1), can be moved to a fully reclined position, that seat back will not extend back past it's associated tracks and privacy panel and thus does not extend back into the following personal space 310 and interfere with the ability of a following passenger, for example a passenger in the window seat assembly 122 in the second row of seat assemblies 112 (or for that matter any of the center or aisle seat assemblies 124, 126 in that second row of seat assemblies 112), to enjoy the full view out of the window 508 (FIG. 4).

Figure 5:
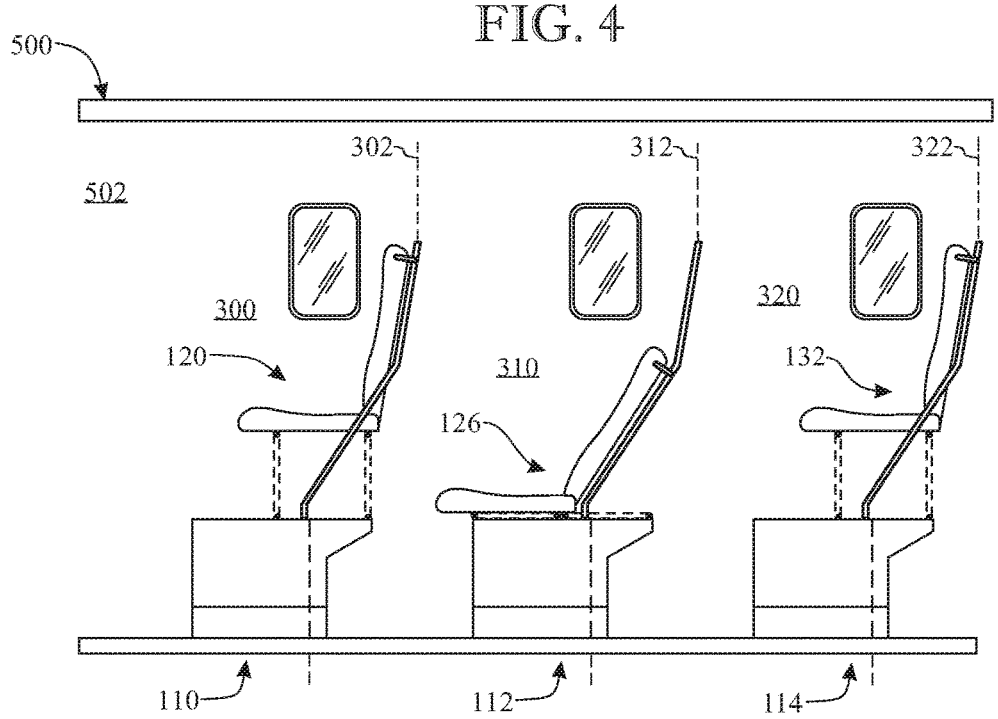
FIG. 5 presents a side elevation view of the three rows of the seating system with the second-row seat in the second or fully reclined position.
Figure 6:
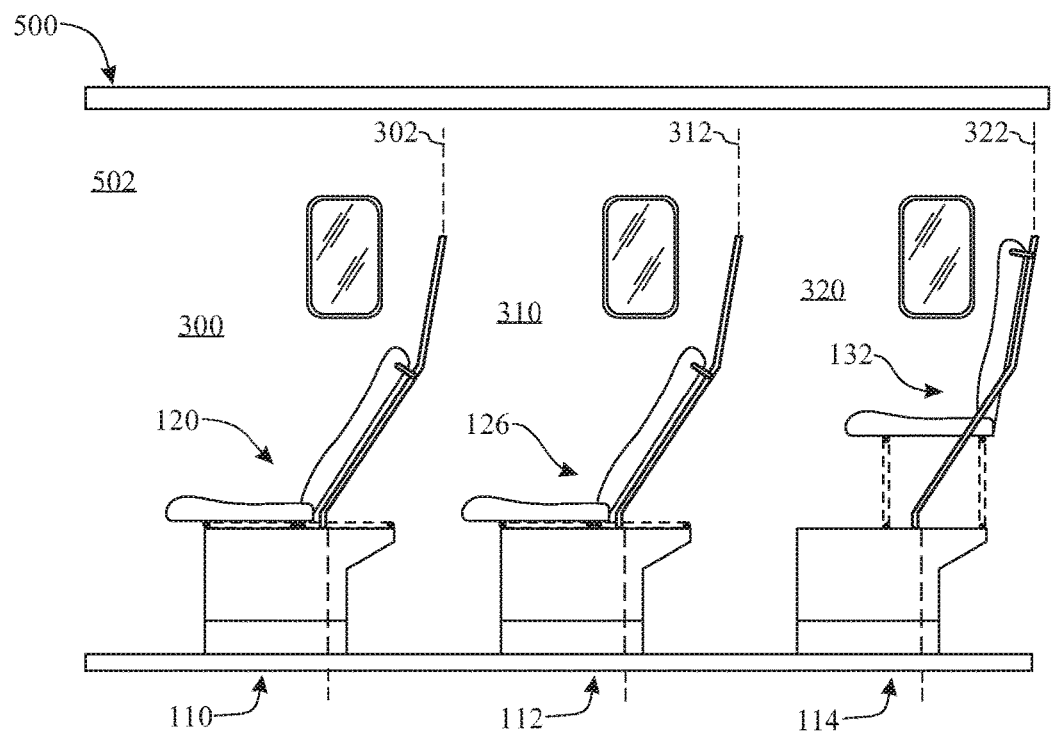
FIG. 6 presents a side elevation view of the three rows of the seating system with both the first-row seat and the second-row seat of the seating system in the second or fully reclined positions.
Figure 7:
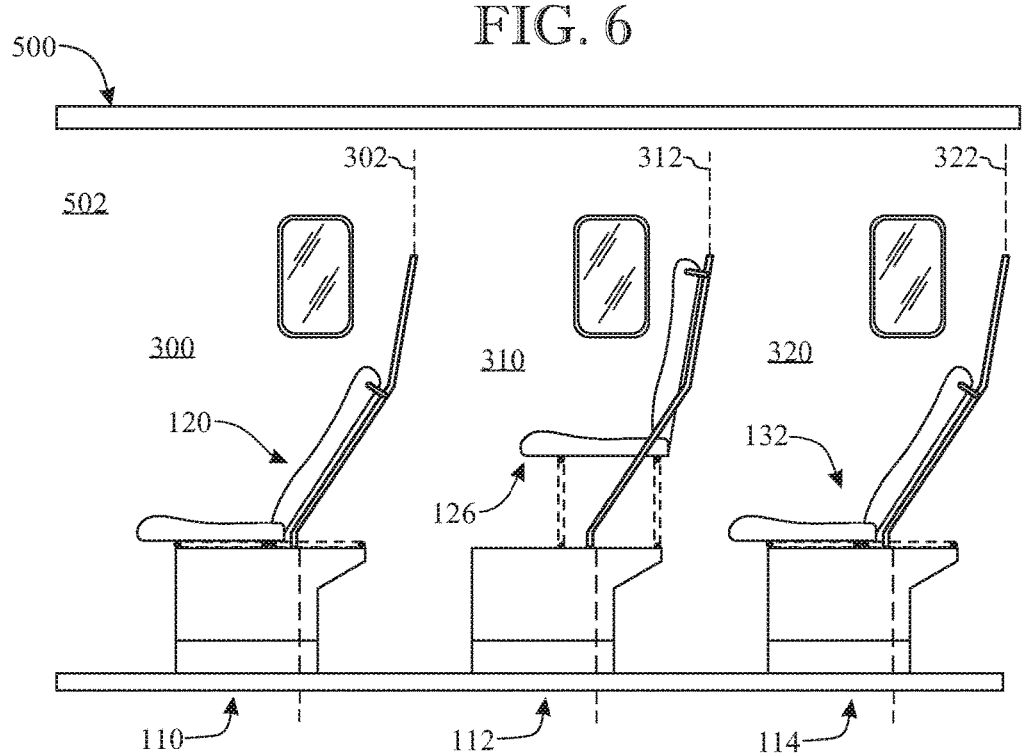
FIG. 7 presents a side elevation view of the three rows of the seating system with the first-row seat and the third-row seat of the seating system in the second or fully reclined positions.

Turning now to FIGS. 5-7, there are illustrated different circumstances where various seats within the first, second and third rows of seat assemblies 110, 112 and 114, respectively, are in a fully reclined position and not intruding into the personal spaces of the following or seats behind. As shown in FIG. 5, the aisle seat assembly 120 in the first row of seat assemblies 110 is in the fully upright position and the aisle seat assembly 126 in the second row of seat assemblies 112 has been actuated to move the aisle seat assembly 126 to a fully reclined position in identical manner to that described hereinabove with regard to aisle seat assembly 120. Thus, the now fully reclined aisle seat assembly 126 does not intrude into the personal space 320 of the third row of seat assemblies 114. It will be understood that all the seat assemblies, including the seat assemblies 116, 118, 122, 124, 126, 128, 130 and 132 illustrated in FIG. 1, are constructed and operate identical to that described hereinabove with regard to the aisle seat assembly 120 in the first row of seat assemblies 110. In this particular illustration, the aisle seat assembly 132 in the third row of seat assemblies 114 is also in the fully upright position.

Referring to FIG. 6, in this illustration, both the aisle seat assembly 120 in the first row of seat assemblies 110 and the aisle seat assembly 126 in the second row of seat assemblies 112 have been moved to their fully reclined positions. The fully reclined aisle seat assembly 120 does not intrude into the personal space 310 of the second row of seat assemblies 112 and the fully reclined aisle seat assembly 126 does not intrude into the personal space 320 of the third row of seat assemblies 114. The aisle seat assembly 132 in the third row of seat assemblies 114 remains in the fully upright position.

With regard to FIG. 7, in this illustration, the aisle seat assembly 126 in the second row of seat assemblies 112 is in the fully reclined position while the aisle seat assembly 120 and the aisle seat assembly 132 in the first and third row of seat assemblies 110 and 114, respectively, are in the fully upright positions.

Figure 8:
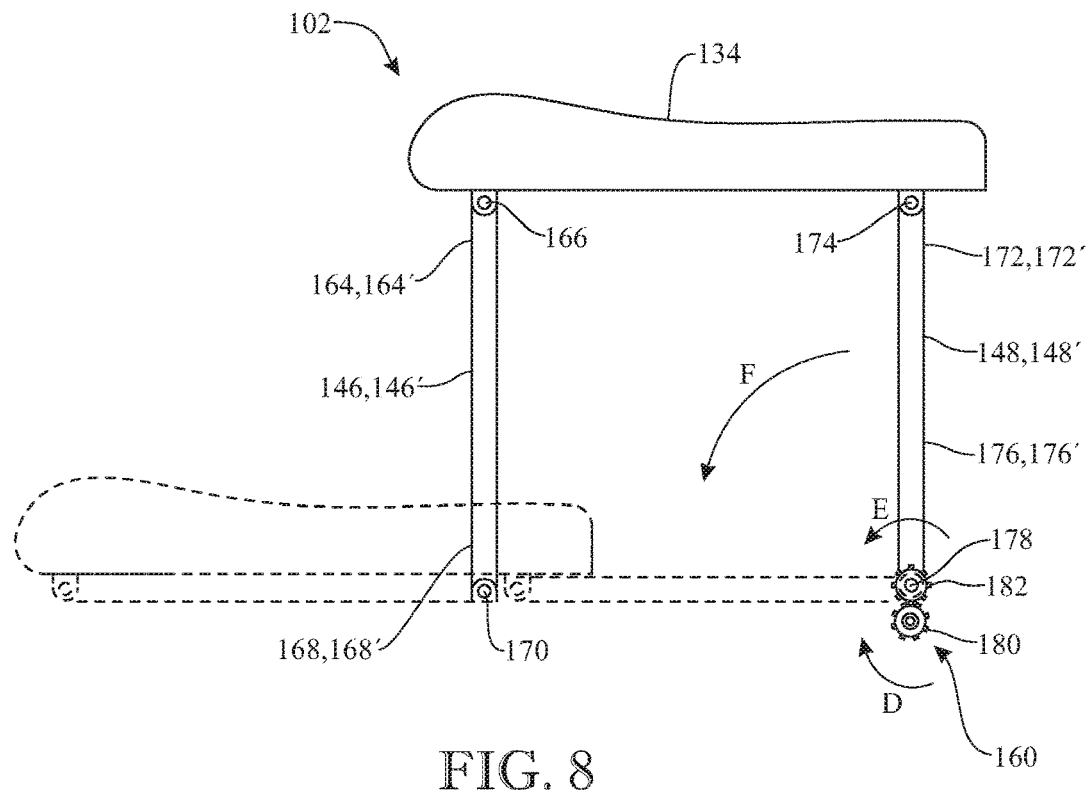
FIG. 8 presents a side elevation view of a seat portion of the seating system, including a portion of an actuating mechanism, illustrating movement of the seat portion of the seating system between the first and second positions.
Figure 9:
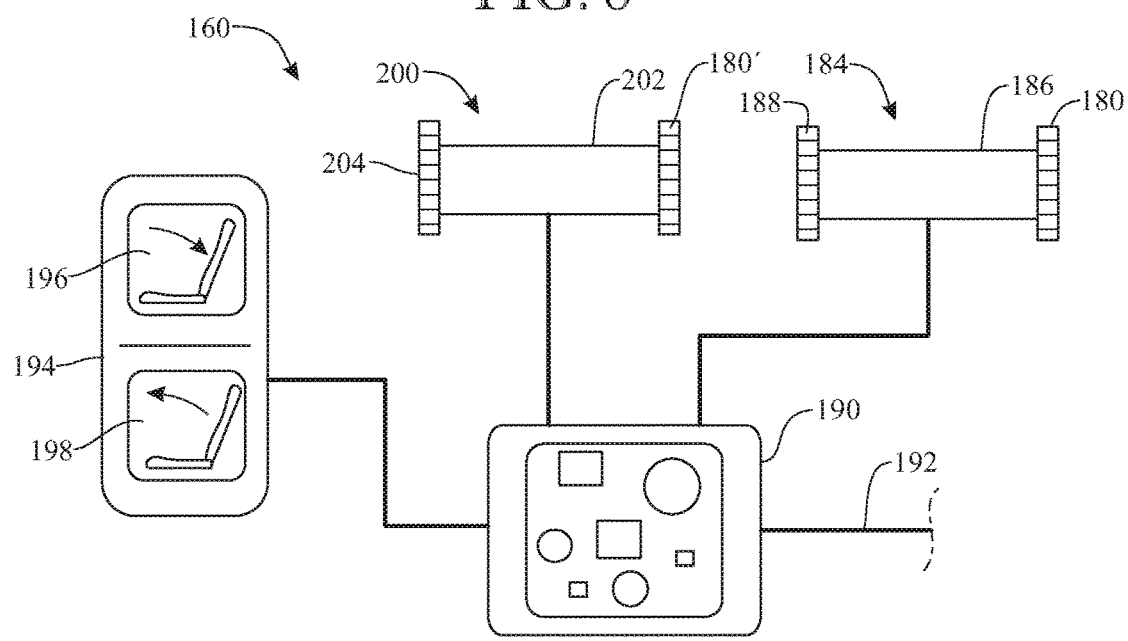
FIG. 9 presents a block diagram of an actuating system associated with the seating system to move seats of the seating system between the first and second positions.

Turning now to FIGS. 8 and 9, and initially with regard to FIG. 8, as noted hereinabove, the aisle seat assembly 120 may be operated by the actuating mechanism 160 to raise and lower the seat bottom 134 of the seat 133 and thus raise or recline the associated seat back 136. As best shown in FIG. 8, upper ends 164, 164' of the forward supports 146, 146' are pivotally connected to the seat bottom 134 by a first articulated connection provided by either separate pivot pins or a single pivot rod 166, and lower ends 168, 168' of the forward supports 146, 146' are connected to the elevated base 150 or the floor 502 of the aircraft cabin 502 by a second articulated connection provided by separate pivot pins or a single pivot rod 170. Likewise, the upper ends 172, 172' of the rear supports 148, 148' are pivotally connected to the seat bottom 134 by a third articulated connection provided by separate pivot pins or a single pivot rod 174, and the lower ends 176, 176' of the rear supports 148, 148' are connected to the elevated base 150 by a fourth articulated connection provided by either separate pivot pins or a single pivot rod 178. The first, second, third and fourth articulated connections form an articulated parallelogram allowing the seat bottom 134 to advance forward parallel to the elevated base 150. The actuating mechanism 160 includes a connection to the pivot rod 178 to rotate the rear supports 148, 148' thus raising and lowering the seat bottom 134. In this embodiment, the actuating mechanism 160 includes a drive gear 180 and a driven gear 182 fixedly mounted to the pivot rod 178. It should be noted that either the driven gear 182 or the pivot rod 178 is affixed to the lower ends 176, 176' of the rear supports 148, 148'. The drive gear 180 and the driven gear 182 are intermeshed such that, as shown, rotation of the drive gear 180 in the clockwise direction (arrow "D") rotates the driven gear 182 in the counterclockwise direction (arrow "E") to force the rear supports 148, 148' forward and downward in the direction of arrow "F" thereby moving the seat bottom 134 to the lowest position. As noted above, this operates to recline the seat back 136 relative to the tracks 140, 140' towards the fully reclined position of FIG. 4. Operation of the actuating mechanism 160 to rotate the drive gear 180 in the opposite or counterclockwise direction thus operates to raise the seat bottom 134 to the uppermost position and elevate the seat back 136 towards the fully upright position of FIG. 2.

Referring to FIG. 9, the actuation mechanism 160 is preferably configured as an automated system for operating the drive gear 180 which can be controlled both by the individual passenger and the flight crew. The actuation mechanism 160 includes a first actuator 184 including the drive gear 180 and a motor 186. A second drive gear 188 may be provided to further assist rotating the driven gear 182. A central processing unit (CPU) 190 is provided to send an actuation signal to the motor 186. The central processing unit 190 can be controlled by the flight crew to raise and/or recline all or individual seats within the aircraft 500. The central processing unit 190 receives electrical power from a power cable 192.

The aisle seat assembly 120 is operable by the individual passenger via a passenger control 194 connected to the central processing unit 190, A recline button 196 on the passenger control 194 operates the motor 186 to recline the associated seat and a raise button operates to raise the seat back to the fully upright position. It should be noted that the flight crew can override individual passenger controls 194 via the central processing unit 190 to raise all the seat backs to the fully upright position for landing and takeoff or lower all the seat backs and thus the seat bottoms to facilitate hoarding of passengers. A second actuator 200 may be provided to operate an opposite end of the rod 178 and engage a driven gear 182' thereon to increase the lifting and lowering forces. The second actuator 200 includes a motor 202 and a drive gear 180' engageable with the driven gear 182'. A second driven gear 204 on the motor 202 may provide additional power to rotate the driven gear 182'.

Alternatively or additionally to the automated system above, the actuation mechanism 160 may include a manually-operable lever, knob or other control (not shown) affixed to the drive gear 162 to operate the drive gear 180 and raise and lower the seat bottom 134 and thus move the seat back 136 between the fully upright and fully reclined positions.

Referring now to FIG. 10, the elevated base 150 includes one or more storage compartments 210, 212, 214 located directly beneath the seats when the seats are reclined and directly beneath the passenger's feet when the seats are upright. The illustration particularly shows three individual storage compartments 210, 212, 214, each compartment associated to a respective seat assembly of the window, center and aisle seat assemblies 116, 118 and 120 in the first row of seat assemblies 110. Having individual storage compartments reduces conflict between passengers and increases passenger satisfaction, as there is no possibility of a passenger not being left space for his/her items because other passengers have taken up an excessive amount of storage space. The storage compartments 210, 212 and 214 are covered by movable doors 216, 218 and 220, respectively, and provide access to the individual storage compartments for storage of passenger luggage such as, for example, cases 400 and 410. It should be noted that the storage compartments 210, 212 and 214 are accessible when the respective seats 116, 118 and 120 are in the fully upright positions. However, the storage compartments 210, 212 and 214 are not accessible when the respective seats 116, 118 and 120 are in the fully reclined position, preventing others from accessing the storage compartment beneath a seat when the passenger occupying said seat is sleeping and thus reducing the chance of personal items being stolen from the compartment. By positioning the storage compartment or compartments 210, 212 and 214 in the elevated base 150, conventional overhead storage compartments may be eliminated increasing safety for the passengers and crew (for instance if flying through strong turbulence or being required to leave their seats in the event of an emergency) as well as providing easier and more direct access to any luggage or items stored therein. Additionally, the personal space overhead, for example personal space 320, is increased diminishing any claustrophobic condition experienced by the passengers. The aisle step 222 provided adjacent to the elevated base 150 assists in accessing the seats on the elevated base 150.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A seating system for a means of transportation, comprising:
    a plurality of seat assemblies, each seat assembly comprising:
        a seat having a seat bottom and a seat back, wherein the seat back is reversibly reclinable relative to the seat bottom from an upright position to a fully reclined position;
        at least one support member pivotably connected to said seat bottom and to a base, said support member supporting said seat and comprising a forward support and a rear support, wherein said forward and rear supports are pivotably connected at first ends to said seat bottom and at opposite ends to said base;
        at least one rearward-sloped track extending upward of the base, wherein said seat back is movably connected to said track;
        an actuator for causing a first movement of the support member configured to cause a forward and downward advance of the seat bottom and a descent of the seat back guided by the track towards the fully reclined position, and a second movement of the support member configured to cause a rearward and upward movement of the seat bottom and a rising of the seat back guided by the track towards the upright position; and
        wherein said first and second movements of said support member comprise a forward and rearward pivoting, respectively, of said support member relative to said base.

2. The seating system of claim 1, wherein the actuator comprises a drive gear engageable with a driven gear of the support member such that rotation of the drive gear causes the driven gear to rotate and the support member to pivot, the actuator further comprising a motor configured to rotate the drive gear.

3. The seating system of claim 1, wherein the support member is configured to maintain the seat bottom in a parallel relationship with said base during said forward and downward advance of the seat bottom and during said rearward and upward movement of the seat bottom.

4. The seating system of claim 1, wherein the at least one rearward-sloped track comprises a pair of rearward-sloped tracks arranged on opposite sides of the seat back.

5. The seating system of claim 1, wherein the seat back is slidably connected to the at least one rearward-sloped track.

6. The seating system of claim 5, wherein the seat assembly further comprises at least one link, wherein each link of the at least one link is connected to the seat back and slidably mounted within a respective track of the at least one rearward-sloped track.

7. The seating system of claim 6, wherein each link of the at least one link is connected to an upper edge of the seat back.

8. The seating system of claim 1, wherein the seat assembly further comprises a privacy panel arranged behind the seat back and shielding the reclining seat back from a seat behind said seat assembly.

9. The seating system of claim 8, wherein the seat back is arranged frontward of the privacy panel in both the fully reclined position and the upright position.

10. The seating system of claim 8, wherein the privacy panel is non-movable relative to the base.

11. The seating system of claim 1, wherein the base is elevated relative to a floor of the means of transportation.

12. The seating system of claim 11, wherein the base comprises at least one storage compartment therewithin and situated beneath the seat.

13. The seating system of claim 12, wherein the at least one storage compartment is accessible from a top of the base.

14. The seating system of claim 12, wherein the at least one storage compartment is accessible when the seat back is in the upright position and is not accessible when the seat back is in the fully reclined position.

15. The seating system of claim 1, wherein the actuator comprises a central processing unit and at least one user-operable control for operating the actuator.

16. A seating system for a means of transportation, comprising:
a plurality of seat assemblies, each seat assembly comprising:
  a seat having a seat bottom and a seat back, wherein the seat back is reversibly reclinable relative to the seat bottom from an upright position to a fully reclined position;
  at least one support member pivotably connected to said seat bottom and to a base, said support member supporting said seat and comprising a forward support and a rear support, wherein said forward and rear supports are pivotably connected at first ends to said seat bottom and at opposite ends to said base;
  at least one rearward-sloped track extending upward of the base, wherein said seat back is movably connected to said track;
  an actuator for causing a first movement of the support member configured to cause a forward and downward advance of the seat bottom and a descent of the seat back guided by the track towards the fully reclined position, and a second movement of the support member configured to cause a rearward and upward movement of the seat bottom and a rising of the seat back guided by the track towards the upright position; wherein
  the base is elevated relative to a floor of the means of transportation, and comprises at least one storage compartment therewithin and situated beneath the seat, wherein the at least one storage compartment is accessible from a top of the base when the seat back is in the upright position and is not accessible when the seat back is in the fully reclined position; and
  wherein said first and second movements of said support member comprise a forward and rearward pivoting, respectively, of said support member relative to said base.

17. A seating system for a means of transportation comprising:
a plurality of seat assemblies, each seat assembly comprising;
  a seat having a seat bottom and a seat back, wherein the seat back is reversibly reclinable relative to the seat bottom from an upright position to a fully reclined position;
  at least one support member pivotably connected to a base and supporting said seat;
  at least one rearward-sloped track extending upward of the base, wherein said seat back is movably connected to said track; and
  an actuator for causing a first movement of the support member configured to cause a forward and downward advance of the seat bottom and a descent of the seat back guided by the track towards the fully reclined position, and a second movement of the support member configured to cause a rearward and upward movement of the seat bottom and a rising of the seat back guided by the track towards the upright position, said actuator comprising a motor configured to rotate a drive gear engageable with a driven gear of said support member such that rotation of said drive gear causes said driven gear to rotate and said support member to pivot; and
  wherein said first and second movements or said support member comprise a forward and rearward pivoting, respectively, of said support member relative to said base.

18. The seating system of claim 16, wherein said actuator comprises a drive gear engageable with a driven gear of the support member such that rotation of the drive gear causes the driven gear to rotate and the support member to pivot, said actuator further comprising a motor configured to rotate said drive gear.

19. The seating system of claim 16, further including a privacy panel arranged behind said seat back when said seat is in both a fully reclined position and an upright position.

20. The seating system of claim 16, wherein said at least one rearward-sloped track comprises a pair of rearward-sloped tracks arranged on opposite sides of said seat back, each of said pair of rearward-sloped track extending upwards along opposite sides of said seat back and terminating about a top end of said seat back, said seat back coupled to each of said pair of rearward-sloped tracks by a pair of links connected to said top end of said seat back.

* * * * *